United States Patent

Brickenstein

[11] Patent Number: 5,439,546
[45] Date of Patent: Aug. 8, 1995

[54] PROCESS FOR WELDING PROFILES, IN PARTICULAR PLASTIC PROFILES

[76] Inventor: Wolf-Jurgen Brickenstein, Am Deverhafen 4, D-2990 Papenburg, Germany

[21] Appl. No.: 353,314

[22] Filed: Dec. 2, 1994

Related U.S. Application Data

[63] Continuation of Ser. No. 165,543, Dec. 13, 1993, abandoned, which is a continuation of Ser. No. 974,308, Nov. 10, 1992, abandoned, which is a continuation of Ser. No. 852,895, Mar. 17, 1992, abandoned, which is a continuation of Ser. No. 515,750, Apr. 30, 1990, abandoned.

[30] Foreign Application Priority Data

May 5, 1989 [DE] Germany ............ 39 14 826.2

[51] Int. Cl.⁶ ............................................. B29C 65/20
[52] U.S. Cl. .......................... 156/304.2; 156/304.5; 156/304.6; 156/309.9; 156/322
[58] Field of Search .............. 156/304.1, 304.2, 304.5, 156/304.6, 309.6, 309.9, 157, 158, 322, 358, 359, 499, 507

[56] References Cited

U.S. PATENT DOCUMENTS

| | | | |
|---|---|---|---|
| 2,958,906 | 11/1960 | Youthed | 156/294 |
| 3,616,024 | 10/1971 | Windle | 156/257 |
| 3,723,229 | 3/1973 | Hutton | 156/580 |
| 4,390,578 | 6/1983 | Brooks | 156/304.5 X |
| 4,645,557 | 2/1987 | Pedersen | 156/250 |
| 4,726,869 | 2/1988 | Matsui et al. | 156/307.3 |
| 4,752,350 | 6/1988 | Schuster | 156/304.5 X |
| 4,753,697 | 6/1988 | Shaposka et al. | 156/158 |
| 4,909,892 | 3/1990 | Quinn et al. | 156/304.2 X |
| 4,913,756 | 4/1990 | Shaposka et al. | 156/304.6 X |
| 4,963,219 | 10/1990 | Nichols et al. | 156/322 X |
| 4,963,421 | 10/1990 | Dickinson et al. | 156/304.2 X |
| 4,971,639 | 11/1990 | Quinn et al. | 156/304.6 X |

FOREIGN PATENT DOCUMENTS 3614673 11/1987 Germany.
3634793 4/1988 Germany.

*Primary Examiner*—David A. Simmons
*Assistant Examiner*—J. Sells
*Attorney, Agent, or Firm*—Pollock, Vande Sande & Priddy

[57] ABSTRACT

A method for welding a first member and a second plastic member, the first member having a first surface and the second member having a second surface which are to be welded to each other, the surfaces having different shape configurations nonconforming to each other includes positioning the first member transversely with respect to the second member with the nonconforming surfaces facing each other, heating the first surface at a welding temperature and transforming the shape of the first surface such as to at least partially conform it to the shape of the second surface, heating the second surface at a welding temperature at the surface area corresponding in size and contour configuration to the first surface and at the location where the first surface is to be welded to the second surface, and welding the first and second heated surface together.

5 Claims, 1 Drawing Sheet

PROCESS FOR WELDING PROFILES, IN PARTICULAR PLASTIC PROFILES

This application is a continuation, of Ser. No. 08/165,543 filed Dec. 13, 1993 abandoned which is a continuation of Ser. No. 07/974,308 filed on Nov. 10, 1992 abandoned which is a continuation of application Ser. No. 07/852,895 filed on Mar. 17, 1992 abandoned which is a continuation of application Ser. No. 07/515,750 filed Apr. 30, 1990 abandoned.

FIELD OF THE INVENTION

The present invention relates to a process for welding profiles, in particular plastic profiles as used for windows, doors, or the like, in which the two profile areas that are to be joined to each other are heated to welding temperature and then joined together after the heating process.

BACKGROUND OF THE INVENTION

In known methods for forming frame corners, the profiles that are to be joined to each other are mitre cut and welded together in the area of the mitre joint. This technique is used both for metal profiles and for plastic profiles.

Welding such profiles in the corner area requires that the profiles that are to be joined each be of identical geometrical configuration in the area of the weld. If this requirement is not fulfilled, and different profile geometries are used, up to now it has been necessary to match the profiles by means of a separating cut that preceeds the welding, in such a way that after this has been done the corner areas can be tightly welded. In many instances, it was not possible to so configure the separating cut as to render a tight weld possible. In this case, one frequently had to dispense with welding and join the profiles at the corners by means of screws.

SUMMARY OF THE INVENTION

The main purpose of the present invention to provide a welding method by which even profiles of differing geometries can be tightly welded to each other.

The process according to the present invention makes it possible to carry out a tight weld in order to form a corner between two profiles that are configured in different ways. In contrast to the formerly known welded joints, in this instance the welded joint is not in the mitred joint but between the normally closed surface of the second profile and the face end of the first profile. In this regard, the face end of the first profile is configured so as to match the surface of the second profile that faces this end surface. If, for example, the surface of the second profile is of an S-shaped contour, the face surface of the first profile that is to be set upon the S-shaped surface must similarly be configured in an S-shape. The face surface of the first profile is normally heated completely, at least, in the outermost edge areas. In contrast to this, the opposite surface of the second profile is only heated in that area, and melted, in the case of plastic, on which the face end of the first profile is to lie after heating.

In a preferred embodiment of the present invention, the heating of the areas that are to be joined together is effected by means of a heating tool that is configured to fit between the two profiles that are to be joined together, and to lie against the areas that are to be heated. The heating tool is, on both sides, of a shape that corresponds to the surface shape of the second profile and in which connection the area of the hot tool that is proximate to the surface of the second profile is of an outer shape that corresponds to the first profile.

A preferred embodiment of the present invention is described in greater detail below with reference being made to the accompanying drawings, wherein:

DETAILED DESCRIPTION OF THE PREFERRED EMBODIMENT(S)

Figure 1:
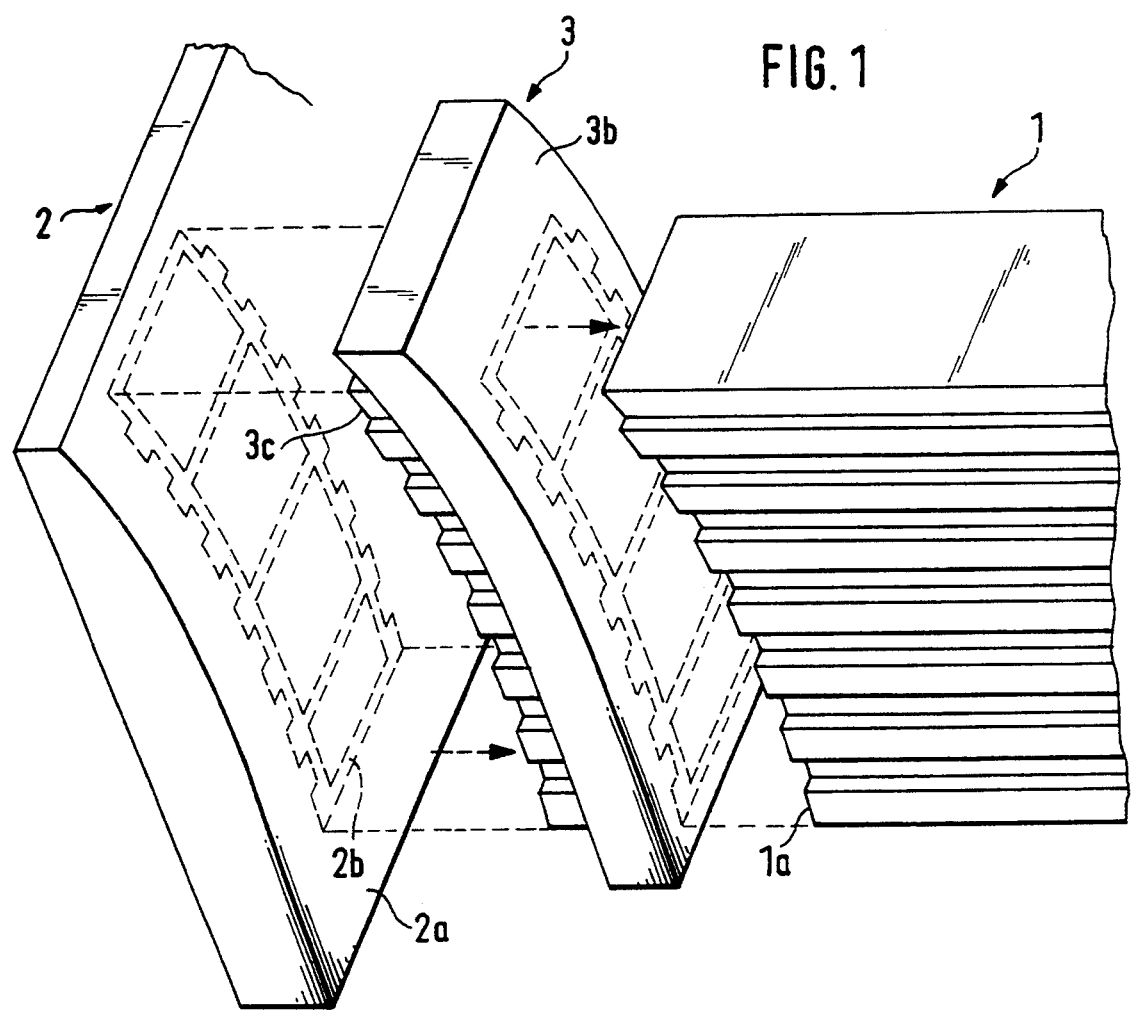
FIG. 1 shows a perspective partial view of a part area of the first profile and of the second profile with a hot welding tool interposed between these.

A first profile 1 comprises a plurality of chambers and is configured so as to have ribs and grooves on its side surfaces. The face end surface of the profile 1 is designated as 1a.

A second profile 2 is shown with its face end surface closed. The second profile has a curved surface 2a that faces the face end 1a of the first profile 1.

Between the surface 2a and the face end 1a there is a heating tool 3. On its right-hand side, as in FIG. 1, this heating tool has a smooth curved surface 3b, the curvature of which is identical to the curvature of the surface 2a. On the side that faces the surface 2a, the heating tool 3 has a surface 3c, the shape of which exactly matches the outer shape of the first profile 1. Furthermore, the spatial configuration of the side 3c corresponds completely to the surface shape of 3b and thus both the surface shape of the surface 2a and of the surface 1a. In the embodiment shown in the drawing, these surfaces are smooth surfaces that taper upwards in a curved shape. Of course, other surface shapes are also possible.

Figure 2:
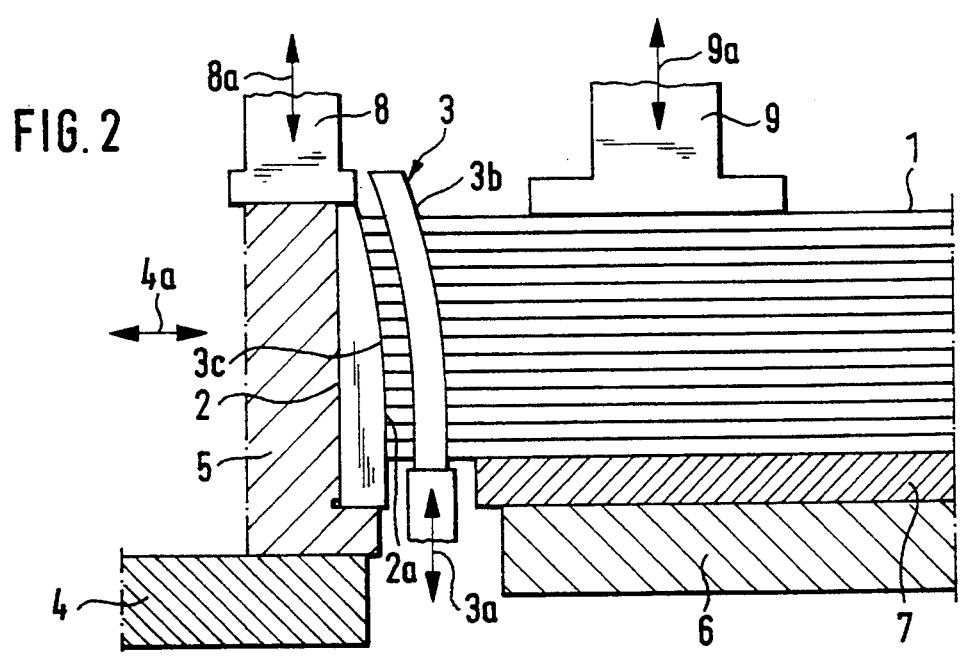
FIG. 2 shows a schematic side view of the profile area during the heating phase that uses the welding tool.

FIG. 2 is a schematic representation of the clamping of the profile 1 and profile 2 on a bench, in which, in the position shown, the heating tool lies with its surface 3c on the surface 2a of the second profile and with its surface 3b on the face surface 1a of the first profile.

The first profile is secured in the receptacle 7 of a fixed area of the bench with the help of a schematically represented clamping cylinder 9. In addition to the fixed area 6, there is an area of the bench 4 that can move in the direction indicated by the double arrow, and this incorporates a receptacle 5. The second profile 2 is locked in the receptacle 5 with the help of the clamping cylinder 8.

In the position shown, the two surfaces 3c and 3b of the hot tool 3 heat the areas that are to be heated. The face surface 1a of the first profile is heated over its entire surface. In FIG. 1, the area of the surface 2a that is heated by the surface 3c of the hot tool 3 is indicated by means of a dashed line and is numbered 2b.

Once the areas that are to be welded have been heated, the bench 4 moves to the left as shown in FIG. 2. The heating tool 3, that can be moved in the direction indicated by the double arrow 3a, is extended out and downwards between the two profiles. Then the bench 4a moves to the right such that the melted face surface 1a and the similarly melted area 2b lie directly on one another and can weld together.

Next, the clamping cylinders 8 and 9 are released, and the corner can be removed.

I claim:

1. A method of forming a traverse joint between a facial surface of a free end portion of a first elongated plastic member having a predetermined outer periphery shape and a normally closed surface of a second plastic member, the configuration of said free end portion surface of said first member matching that of said surface of said second plastic member, said method comprising the steps of:

interposing a heating tool between said first and second plastic members, said heating tool having opposite heating surfaces configured to correspond to said configuration of said surface of said second plastic member, a cross-sectional area of a heating surface facing said closed surface of said second member having an outer periphery substantially matching that of said free end portion of said first member;

heating said facial surface of said free end portion at a welding temperature at least at its outer periphery shape to render it plasticized;

heating said closed surface of said second plastic member at a welding temperature to render it plasticized only over an area matching the outer periphery of said free end portion of said first plastic member to form an impression of said end portion in said closed surface at the location where said first plastic member is to be joined to said closed surface of said second plastic member; and joining said heated, plasticized surfaces together to form said traverse joint.

2. A method according to claim 1, wherein said first and second plastic member include different outer periphery configurations of said end portion and said facial surface.

3. A method according to claim 1, wherein said end facial surface of said first member is substantially grooved outer periphery configuration and said surface of said second member has unbroken continuous and curved configuration.

4. A method according to claim 1, wherein said first member and said second member are welded to each other to form a right angle.

5. A method according to claim 4, wherein the surface of said second member that faces said first member is configured as a smooth unbroken surface.

* * * * *